(No Model.)

M. W. DEWEY.
ELECTRICALLY PROPELLED VEHICLE.

No. 464,248. Patented Dec. 1, 1891.

WITNESSES:
J. J. Laass.
C. L. Bendixon

INVENTOR,
Mark W. Dewey,
Duell, Laass & Duell,
his ATTORNEYS.

UNITED STATES PATENT OFFICE.

MARK W. DEWEY, OF SYRACUSE, NEW YORK, ASSIGNOR TO THE DEWEY CORPORATION, OF SAME PLACE.

ELECTRICALLY-PROPELLED VEHICLE.

SPECIFICATION forming part of Letters Patent No. 464,248, dated December 1, 1891.

Application filed March 23, 1891. Serial No. 386,971. (No model.)

*To all whom it may concern:*

Be it known that I, MARK W. DEWEY, of Syracuse, in the county of Onondaga, in the State of New York, have invented new and useful Improvements in Electrically-Propelled Vehicles, (Case No. 88,) of which the following, taken in connection with the accompanying drawings, is a full, clear, and exact description.

My invention relates to electric-motor mechanism for electrically-propelled vehicles, and especially those vehicles having wheels on opposite sides thereof adapted to turn relatively to each other to facilitate in turning corners.

The objects of my invention are to dispense with a compensating gear for the purpose of allowing a relative movement of the wheels on opposite sides of a vehicle, and to propel a vehicle by an electric motor mounted upon an axle thereof and having parts adapted to rotate in opposite directions.

To this end my invention consists in the combination, with wheels on opposite sides of the vehicle adapted to turn relatively to each other, of an electric motor having its armature and field-magnet adapted to rotate in opposite directions and each connected independently with the said wheels.

My invention consists, also, in the combination, with an axle divided in two parts to turn relatively to each other, of an electric motor having its armature and field-magnet adapted to rotate in opposite directions, the said field-magnet being connected to and arranged to communicate motion to one part of the axle, and the said armature being connected to and adapted to communicate motion to the other part of the axle and in the same direction as the first-mentioned parts; and my invention consists, further, in certain other arrangements and combinations of parts hereinafter described, and specifically set forth in the claims.

Figure 1:
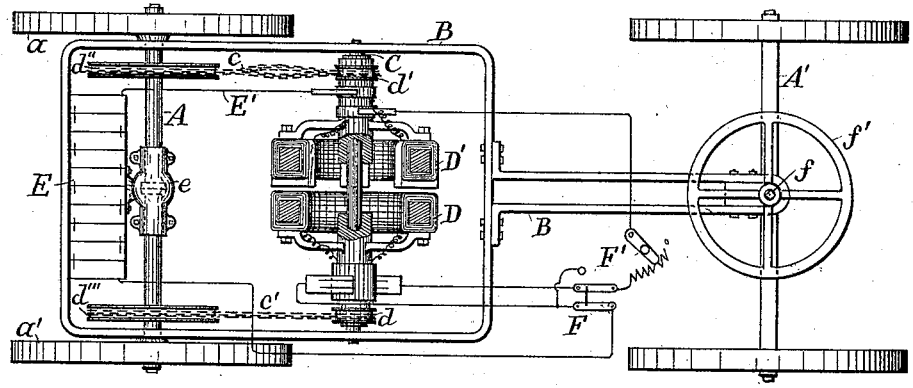
Figure 2:
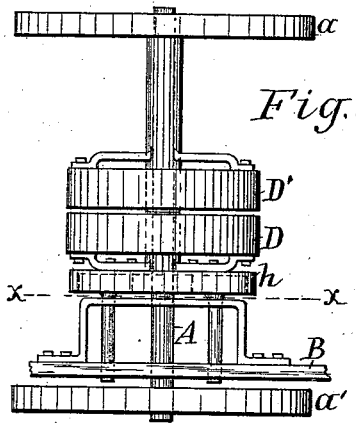
Figure 3:
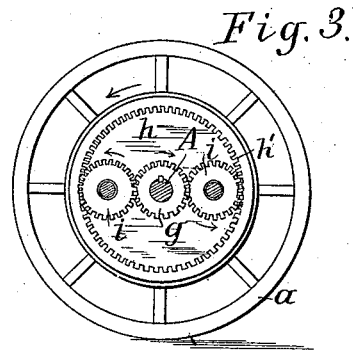
Figure 4:
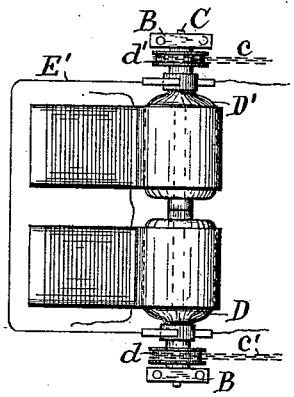
Figure 5:
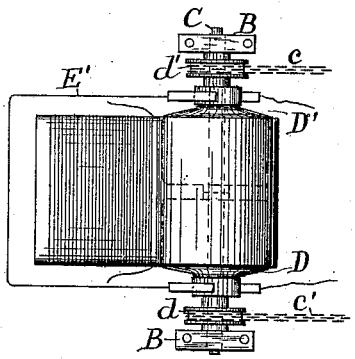

Referring to the drawings, Figure 1 is a plan view of a running-gear of a vehicle provided with my invention. Fig. 2 shows the motor mounted upon the driving-axle. Fig. 3 is a view on line $x \, x$ of Fig. 2. Fig. 4 shows two motors arranged for the purpose of my invention, and Fig. 5 illustrates a motor with two independently-rotatable armatures to accomplish the same purpose.

I do not limit myself to the particular form of gearing shown nor to the styles of electric motors shown for connection therewith, as many other arrangements and constructions may be employed without departing from my invention.

In the drawings, A is the driving-axle of a vehicle or car.

A' is the steering-axle when one is employed.

$a$ and $a'$ are the wheels carried by the driving-axle, and B is the frame of the vehicle.

Between the two axles and upon the truck or frame B, I mount the electric motor, as shown in Fig. 1. The said motor is journaled upon a stationary shaft or axle C, which is parallel with the driving-axle. Both of the movable parts of the motor or the armature D and the field-magnet D' are sleeved upon the shaft C, and are free to revolve by the electric current in opposite directions. Upon the sleeves of the armature and field-magnet are pulleys or sprocket-wheels $d$ and $d'$. These pulleys or wheels are connected with pulleys or sprocket-wheels $d''$ and $d'''$ on the driving-axle by belts or chains $c$ and $c'$. The driving-axle is divided in the center and the ends are enlarged and bear against each other, as shown in dotted lines. A stationary sleeve $e$ envelops the central part of the said axle to hold it securely in place. The wheels $a$ and $a'$ and the sprocket-wheels $d''$ and $d'''$ are keyed to their respective parts of the driving-axle, so that the driving-wheel $a'$ will be rotated by the armature of the motor and the driving-wheel $a$ by the field-magnet of the motor. In order that both driving-wheels may be rotated in the same direction, one of the chains is twisted. In Fig. 1 of the drawings the chain $c$ is shown twisted.

It will be noticed that by allowing both members of the motor to revolve in opposite directions the speed of either member is reduced to one-half of what it would be if one of the members was stationary, and the speed of the driving-wheels is correspondingly reduced.

When both axles of the vehicle are driving-axles, both may be divided and operated by the same motor or separate motors, as desired.

The axle A' is shown in Fig. 1 secured at its center to a vertical shaft $f$, at the upper end of which is a hand-wheel $f'$ for turning the axle. Said shaft $f$ is journaled in a block bolted to the front part of the frame B. I do not limit myself to the steering apparatus shown, as any other suitable means may be employed for steering the vehicle. In the same figure I show a storage or secondary battery E, mounted upon the gear or rear part of the frame of the vehicle, an electric circuit E', including the battery and motor, and current-controlling devices F and F', connected in the circuit.

In Figs. 2 and 3 the motor is shown mounted upon the driving-axle. To derive the requisite movement of the driving-wheels with this arrangement only the wheel $a'$ is keyed to axle A, and the wheel $a$ is secured upon the end of an extension of the sleeve of the field-magnet D'. Both members of the motor are arranged, as before, to revolve in opposite directions, and in order to rotate both driving-wheels in the same direction I secure to the sleeve of the member D a disk $h$, having a flange extending from the side thereof opposite to that attached to the sleeve at right angles and concentric with the axle A, and on the inner side of the said flange I form a circular rack $h'$. Upon the axle A, concentric with the rack, is keyed a small spur-gear $g$.

On opposite sides of the axle A and between the gear-wheel $g$ and the rack $h'$ I place two small gear-wheels $i\ i$ in mesh with the said gear-wheel and rack. The gear-wheels $i\ i$ are each keyed to a short shaft, which is journaled in the frame B and a bar parallel with and secured to the frame, but close to the hubs of said wheels. The unfeathered arrows in Fig. 3 show the direction of movement of the gear-wheels when the armature of the motor rotates in a direction opposite to the movement of the hands of a clock. The gear-wheel is rotated in a direction opposite to the movement of the armature.

It will be obvious that resistances being equal on both driving-wheels both will be rotated at the same time and in the same direction with equal velocities, the effort exerted by the motor being equal at both wheels at all times. If the vehicle be turning a corner, however, the greater resistance on the inside wheel retards that, while the outer wheel necessarily moves more rapidly over its longer path, as the relative speed between the two members of the motor is maintained, although one member is allowed to move faster than the other. A similar effect may be derived by means of two independent electric motors, as shown in Fig. 4, or by means of a single electric motor having two independent rotatable armatures, as shown in Fig. 5 of the drawings. The armatures or movable parts of the motor mechanism in the last two figures may be connected or geared to the driving-wheels as hereinbefore described in reference to the other figures. The field-magnets or the stationary parts of the motors may be in this case fixed to the frame of the vehicle in any suitable manner.

I prefer to employ two pinions $i$ on diametrically opposite sides of the gear-wheel $g$, as by this arrangement side-thrust upon the axle is obviated.

Having described my invention, what I claim as new, and desire to secure by Letters Patent, is—

1. In an electrically-propelled vehicle, the combination, with wheels on opposite sides of the vehicle adapted to turn relatively to each other, of an electric motor having its armature and field-magnet adapted to rotate in opposite directions and each connected independently with the said wheels.

2. In an electrically-propelled vehicle, the combination, with wheels on opposite sides of the vehicle adapted to turn relatively to each other, of an electric motor having its armature and field-magnet adapted to rotate in opposite directions, the said field-magnet being geared to and arranged to communicate rotation to one wheel, and the said armature being geared to and adapted to communicate rotation to the other wheel, substantially as described.

3. In an electrically-propelled vehicle, the combination, with an axle thereof divided in two parts to turn relatively to each other, of an electric motor having its armature and field-magnet adapted to rotate in opposite directions, the said field-magnet being connected to and arranged to communicate motion to one part of the axle, and the said armature being connected to and adapted to communicate motion to the other part of the axle and in the same direction as the first-mentioned part.

4. In an electrically-propelled vehicle, the combination, with wheels on opposite sides of the vehicle adapted to turn relatively to each other, of an electric motor having two independently-movable parts and each connected with the said wheels.

5. In an electrically-propelled vehicle, the combination, with the running-gear thereof having two axles, one of which is adapted to turn upon a vertical axis and the other stationary, of an electric motor having its armature and field-magnet adapted to rotate in opposite directions and each independently connected to the stationary axle of the vehicle.

6. In an electrically-propelled vehicle, the combination, with the running-gear thereof having wheels on opposite sides adapted to turn relatively to each other, of an electric motor having its armature and field-magnet adapted to rotate in opposite directions and each independently connected to the running-gear of the vehicle, and a secondary battery supported by said gear to supply current to the motor.

7. In an electrically-propelled vehicle, the combination, with an axle, wheels carried by said axle, adapted to rotate relatively to each other, of an electric motor having its armature and field-magnet adapted to rotate in opposite directions and mounted upon said axle and each connected independently with the wheels of said axle.

8. In an electrically-propelled vehicle, the combination, with an axle, wheels carried by said axle, adapted to rotate relatively to each other, of an electric motor having two independently-rotatable parts mounted upon said axle and each connected to the said wheels, substantially as described.

9. In an electrically-propelled vehicle, the combination, with an axle, wheels carried by said axle, adapted to rotate relatively to each other, of an electric motor having its armature and field-magnet adapted to rotate in opposite directions and mounted upon said axle, and one of the parts of said motor fixed to one of said wheels and the other part connected to the other wheel through gearing to rotate both wheels in the same direction, as and for the purpose described.

In testimony whereof I have hereunto signed my name this 16th day of March, 1891.

MARK W. DEWEY. [L. S.]

Witnesses:
 C. H. DUELL,
 C. L. BENDIXON.